(12) United States Patent
Kunimasa et al.

(10) Patent No.: US 12,436,382 B2
(45) Date of Patent: Oct. 7, 2025

(54) LASER SCANNING UNIT AND IMAGE FORMING APPARATUS

(71) Applicant: KYOCERA Document Solutions Inc., Osaka (JP)

(72) Inventors: Takuto Kunimasa, Osaka (JP); Jun Nakai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/882,577

(22) Filed: Sep. 11, 2024

(65) Prior Publication Data

US 2025/0147303 A1    May 8, 2025

(30) Foreign Application Priority Data

Nov. 6, 2023  (JP) ................. 2023-189045

(51) Int. Cl.
| | | |
|---|---|---|
| *G03G 15/04* | (2006.01) | |
| *B41J 2/44* | (2006.01) | |
| *B41J 2/47* | (2006.01) | |
| *G02B 26/12* | (2006.01) | |
| *G03G 15/043* | (2006.01) | |

(52) U.S. Cl.
CPC ............ *G02B 26/121* (2013.01); *B41J 2/442* (2013.01); *B41J 2/471* (2013.01); *G03G 15/0435* (2013.01)

(58) Field of Classification Search
CPC .... G03G 15/0435; G02B 26/10; G02B 26/12; G02B 26/121; B41J 2/442; B41J 2/471

USPC .................................. 399/118, 177, 221
See application file for complete search history.

(56) References Cited

U.S. PATENT DOCUMENTS

2009/0244670 A1   10/2009  Sato et al.
2012/0081770 A1   4/2012   Sato et al.

FOREIGN PATENT DOCUMENTS

| JP | 2004038879   | * | 2/2004 |
| JP | 2009198888 A |   | 9/2009 |
| JP | 2017032866   | * | 2/2017 |

* cited by examiner

*Primary Examiner* — Hoan H Tran
(74) *Attorney, Agent, or Firm* — Alleman Hall & Tuttle LLP

(57) ABSTRACT

A motor that rotates a rotation shaft of a polygon mirror is mounted on a motor board. A first photoelectric conversion element senses beam light reflected by each of a plurality of mirror surfaces. A sensing target portion is provided to the rotation shaft. A light sensor is disposed apart from the motor board and includes a light emitting portion and a second photoelectric conversion element. An amplification circuit amplifies a sense signal of the second photoelectric conversion element. A control device controls a timing of starting to form an electrostatic latent image on the basis of a sense signal of the first photoelectric conversion element. The control device identifies a scanning surface that is scanning the beam light on the basis of the sense signal of the second photoelectric conversion element amplified by the amplification circuit, and adjusts a pixel pitch of the electrostatic latent image.

3 Claims, 4 Drawing Sheets

LASER SCANNING UNIT AND IMAGE FORMING APPARATUS

INCORPORATION BY REFERENCE

This application is based upon and claims the benefit of priority from the corresponding Japanese Patent Application No. 2023-189045 filed on Nov. 6, 2023, the entire contents of which are incorporated herein by reference.

BACKGROUND

This disclosure relates to a laser scanning unit and an image forming apparatus that each control an operation of a beam light source in accordance with the rotational state of a polygon mirror.

An electrophotographic image forming apparatus includes a laser scanning unit that scans beam light over the surface of a photoconductor. In the laser scanning unit, a rotary polygon mirror reflects beam light to scan the beam light over the surface of the photoconductor.

The polygon mirror has a plurality of mirror surfaces disposed in a polygonal shape. The laser scanning unit forms an electrostatic latent image on the surface of the photoconductor by scanning the beam light.

SUMMARY

A laser scanning unit according to an aspect of this disclosure includes: a beam light source; a motor board; a first photoelectric conversion element; a sensing target portion; a light sensor; an amplification circuit; and a control device. The beam light source emits beam light. The polygon mirror includes a plurality of mirror surfaces and a rotation shaft. The polygon mirror scans the beam light by rotating while reflecting the beam light. The motor board is a board on which a motor is mounted. The motor rotates the rotation shaft of the polygon mirror. The first photoelectric conversion element is disposed apart from the motor board. The first photoelectric conversion element senses the beam light reflected by each of the plurality of mirror surfaces of the polygon mirror. The sensing target portion is a portion that is provided to the rotation shaft of the polygon mirror and has a different light reflection characteristic from a light reflection characteristic of another portion of the rotation shaft in a circumferential direction. The light sensor is disposed apart from the motor board. The light sensor includes a light emitting portion and a second photoelectric conversion element. The light emitting portion emits light to the rotation shaft of the polygon mirror. The second photoelectric conversion element senses light reflected by the rotation shaft of the polygon mirror. The amplification circuit amplifies a sense signal of the second photoelectric conversion element. The control device controls a timing of starting to form an electrostatic latent image on a photoconductor by the beam light source for each of the plurality of mirror surfaces on the basis of a sense signal of the first photoelectric conversion element. The control device identifies a scanning surface of the plurality of mirror surfaces that is scanning the beam light on the basis of the sense signal of the second photoelectric conversion element amplified by the amplification circuit, and adjusts a pixel pitch of the electrostatic latent image for each scanning surface.

An image forming apparatus according to another aspect of this disclosure includes: a photoconductor; the laser scanning unit; a developing device; and a transfer device. The laser scanning unit forms an electrostatic latent image on a surface of the photoconductor by scanning beam light over the surface of the photoconductor. The developing device develops the electrostatic latent image on the surface of the photoconductor by a developer. The transfer device transfers an image on the surface of the photoconductor by the developer to a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of this disclosure will be described in detail with reference to the drawings. It is to be noted that the following embodiment is a specific example of this disclosure and does not limit the technical scope of this disclosure.

An image forming apparatus 10 according to the embodiment executes a print process in an electrophotographic manner. The print process is a process of forming an image on a sheet 9. The sheet 9 is an image forming medium such as a paper sheet or a sheet-shaped resin member.

Figure 1:
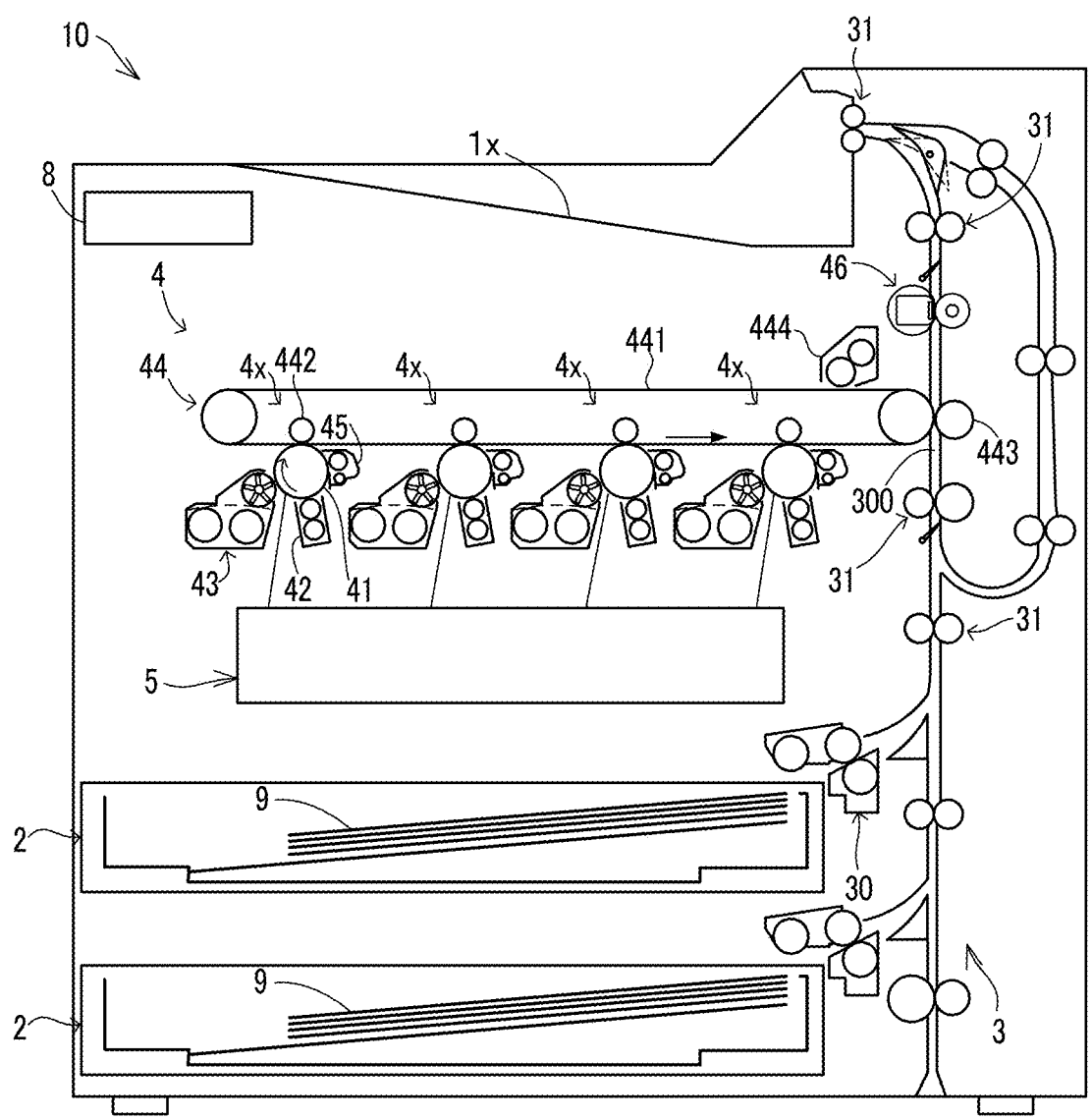
FIG. 1 is a configuration diagram of an image forming apparatus according to an embodiment.

[Configuration of Image Forming Apparatus 10] As illustrated in FIG. 1, the image forming apparatus 10 includes a sheet conveying device 3, a printing device 4, and a control device 8.

The sheet conveying device 3 includes a sheet feeding mechanism 30 and a plurality of conveying roller pairs 31. The sheet feeding mechanism 30 sends the sheet 9 stored in a sheet storing portion 2 to a conveyance path 300. The conveyance path 300 is a path in which the sheet 9 is conveyed.

The plurality of conveying roller pairs 31 is rotationally driven by unillustrated motors. The plurality of conveying roller pairs 31 conveys the sheet 9 along the conveyance path 300 and further discharges the sheet 9 to a discharge tray 1x by rotating.

The printing device 4 executes the print process in an electrophotographic manner. In the example illustrated in FIG. 1, the image forming apparatus 10 is a tandem-type color-image forming apparatus.

The printing device 4 includes a plurality of image forming portions 4x corresponding to a plurality of development colors. Further, the printing device 4 includes a laser scanning unit 5, a transfer device 44, and a fixing device 46.

Each of the image forming portions 4x includes a drum-shaped photoconductor 41, a charging device 42, a developing device 43, a drum cleaning device 45, and the like. That is, the printing device 4 includes the plurality of photoconductors 41, the plurality of developing devices 43, and the plurality of drum cleaning devices 45 corresponding to a plurality of toner colors.

In each of the image forming portions 4x, the photoconductor 41 rotates and the charging device 42 charges the surface of the photoconductor 41. The laser scanning unit 5 scans a plurality of pieces of laser light over the respective surfaces of the plurality of photoconductors 41 that is each charged. The laser scanning unit 5 hereby forms electrostatic latent images on the respective surfaces of the plurality of photoconductors 41.

Each of the pieces of laser light is an example of beam light that is scanned over the surface of the photoconductor 41.

In each of the image forming portions 4x, the developing device 43 develops the electrostatic latent image into a toner image by supplying the surface of the photoconductor 41 with a toner. The toner is a granular developer. The photoconductor 41 is an example of an image-carrying member that rotates while carrying the toner image.

In this embodiment, the printing device 4 includes the four image forming portions 4x corresponding to the toners of the four development colors of yellow, cyan, magenta, and black. The printing device 4 thus includes the four photoconductors 41, the four developing devices 43, and the four drum cleaning devices 45.

The four toner images are formed on the surfaces of the four photoconductors 41. The transfer device 44 transfers the four toner images to the sheet 9 from the four photoconductors 41.

The transfer device 44 includes an intermediate transfer belt 441, four primary transfer devices 442 corresponding to the four image forming portions 4x, a secondary transfer device 443, and a belt cleaning device 444.

The four primary transfer devices 442 transfer the toner images on the surfaces of the four photoconductors 41 to the surface of the intermediate transfer belt 441. This forms, on the surface of the intermediate transfer belt 441, a color toner image in which the toner images of the four photoconductors 41 are combined.

The secondary transfer device 443 transfers the color toner image formed on the intermediate transfer belt 441 to the sheet 9 at a transfer position in the conveyance path 300.

The fixing device 46 pressurizes the color toner image transferred to the sheet 9 while heating the color toner image. The fixing device 46 hereby fixes the color toner image to the sheet 9.

The drum cleaning devices 45 remove the toners remaining on the respective surfaces of the photoconductors 41. The belt cleaning device 444 removes the toner remaining on the intermediate transfer belt 441.

The control device 8 executes various kinds of data processing and control over devices such as the sheet conveying device 3 and the printing device 4.

Figure 2:
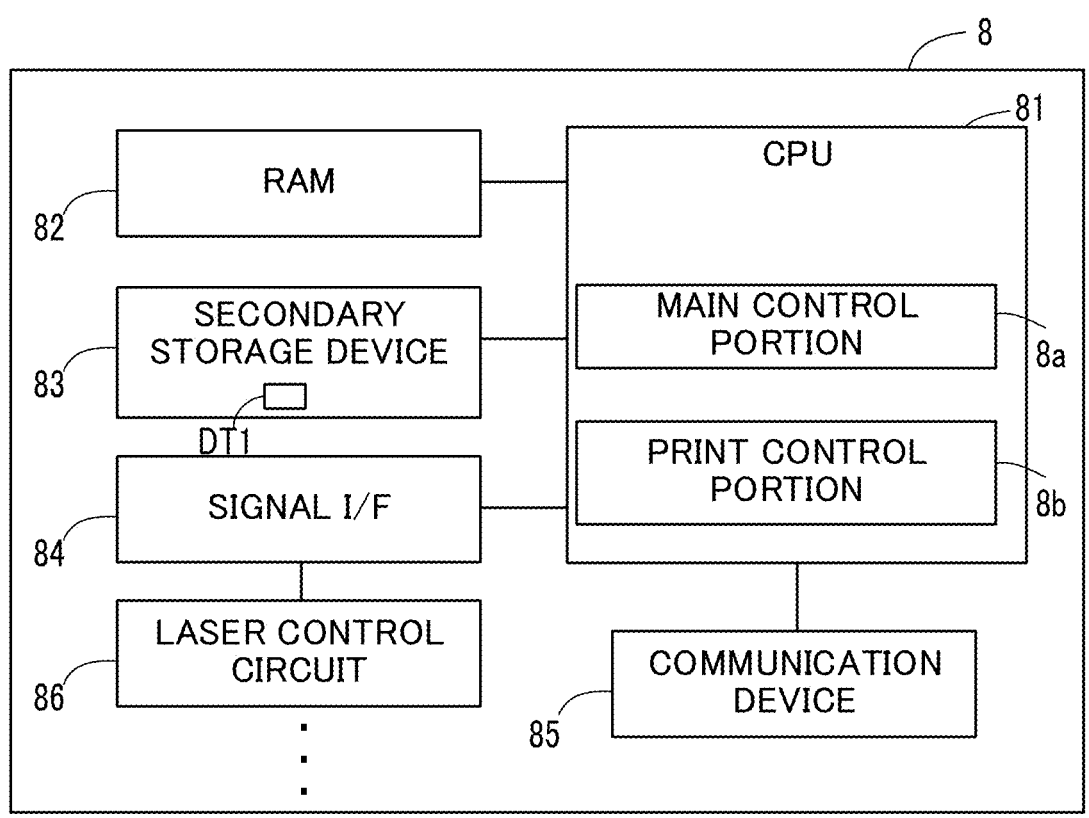
FIG. 2 is a block diagram illustrating a configuration of a control device in the image forming apparatus according to the embodiment.

As illustrated in FIG. 2, the control device 8 includes a CPU (Central Processing Unit) 81 and peripheral devices. The peripheral devices include a RAM (Random Access Memory) 82, a secondary storage device 83, a signal interface 84, and the like.

Further, the control device 8 includes a communication device 85 and a laser control circuit 86.

The CPU 81 is a processor that executes the various kinds of data processing and the control by executing a computer program.

The RAM 82 is a computer-readable volatile storage device. The RAM 82 primarily stores the computer program that is executed by the CPU 81 and data that is outputted and referred to in the processes of executing the various kinds of processing by the CPU 81.

The communication device 85 executes communication with another device such as a host device that transmits a print job to the image forming apparatus 10. The CPU 81 communicates with the other device through the communication device 85.

The CPU 81 includes a plurality of processing modules that is implemented by executing the computer program. The plurality of processing modules includes a main control portion 8a, a print control portion 8b, and the like.

The main control portion 8a executes start control or the like that causes various kinds of processing to be started in response to an operation on an unillustrated operation device.

The print control portion 8b controls the sheet conveying device 3. Further, the print control portion 8b causes the printing device 4 to execute the print process in synchronization with the conveyance of the sheet 9 by the sheet conveying device 3.

The print control portion 8b controls the charging device 42, the developing device 43, the transfer device 44, and the fixing device 46. Further, the print control portion 8b controls the laser scanning unit 5 through the signal interface 84 and the laser control circuit 86.

The secondary storage device 83 is a computer-readable non-volatile storage device. For example, one of a flash memory or a hard disk drive, or both a flash memory and a hard disk drive are adopted as the secondary storage device 83.

The signal interface 84 converts sense signals that are outputted from a variety of sensors to digital data and transmits the digital data to the CPU 81. Further, the signal interface 84 converts a control command that is outputted from the CPU 81 to a control signal and transmits the control signal to a control target device.

The laser control circuit 86 controls the lighting and extinction of each of a plurality of light sources 51 included in the laser scanning unit 5 in accordance with lighting pattern data that is supplied from the print control portion 8b. The lighting pattern data indicates the plurality of pixels of each of the electrostatic latent images formed on the surfaces of the photoconductors 41.

The laser control circuit 86 and the print control portion 8b that controls the laser control circuit 86 are included in part of the laser scanning unit 5.

Figure 3:
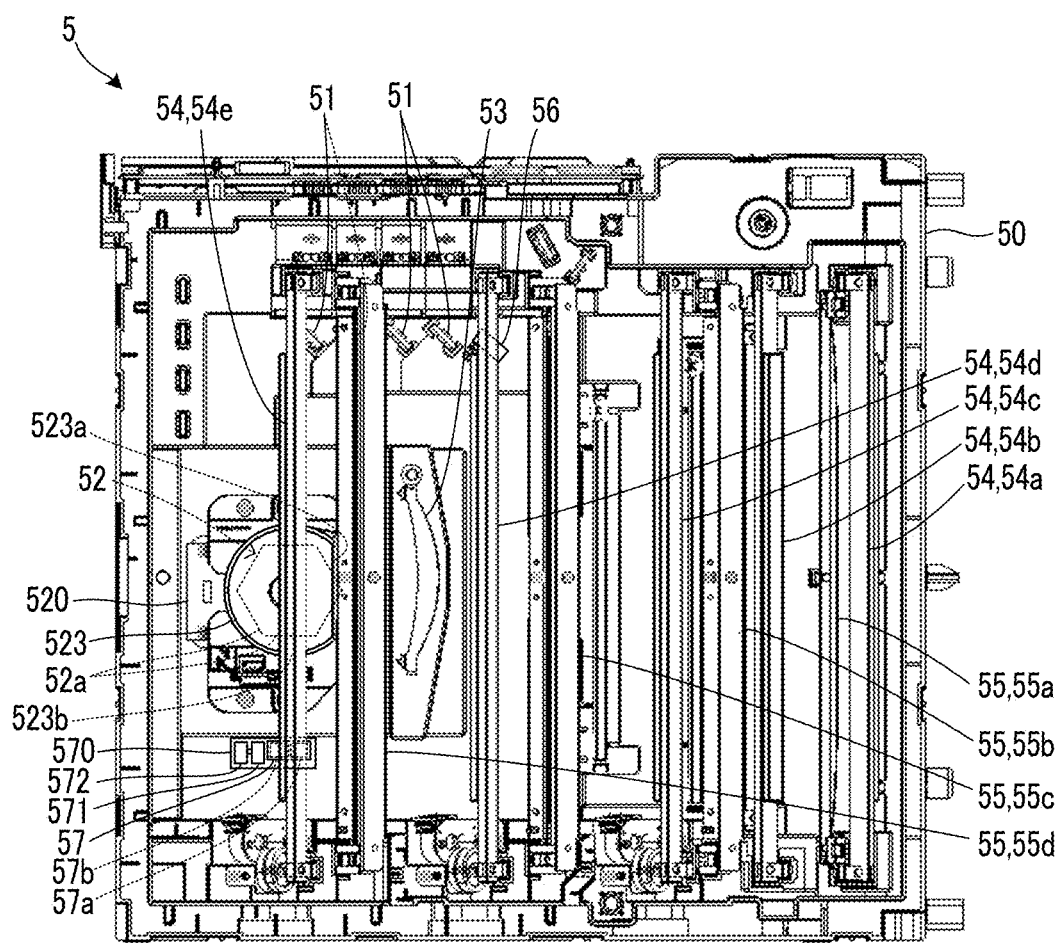
FIG. 3 is a plan view of a laser scanning unit in the image forming apparatus according to the embodiment.
Figure 3:
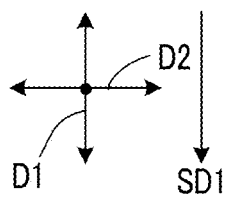
Figure 4:
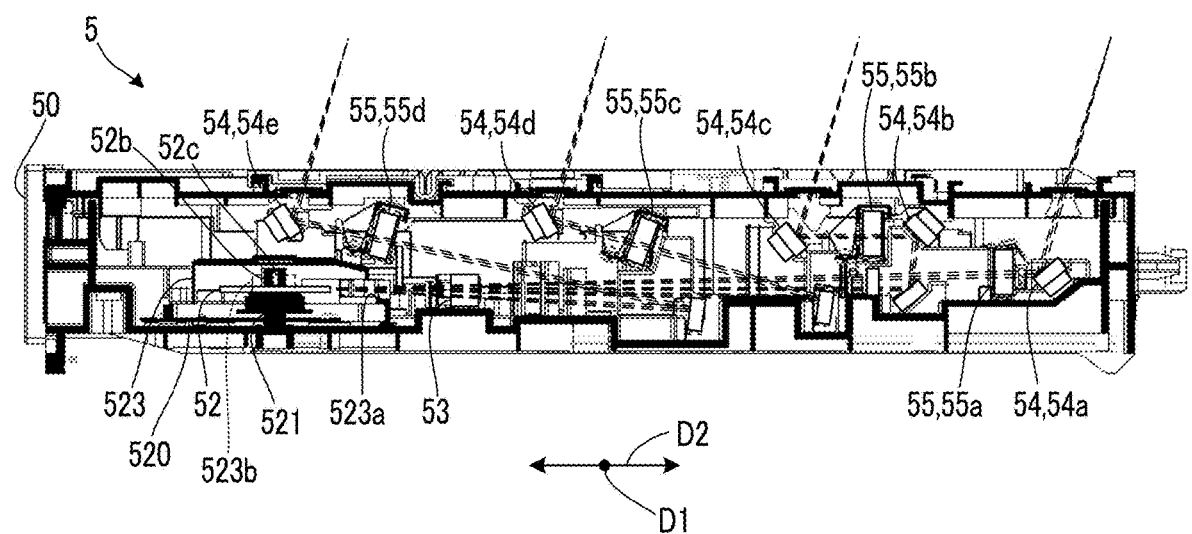
FIG. 4 is a longitudinal sectional view of the laser scanning unit in the image forming apparatus according to the embodiment.

As illustrated in FIGS. 3 and 4, the laser scanning unit 5 includes a housing 50, the plurality of light sources 51, a polygon mirror 52, and a motor board 520. The motor board 520 is a board on which a polygon motor 521 is mounted.

Further, the laser scanning unit 5 includes a main lens 53, a plurality of long mirrors 54, and a plurality of sub-lenses 55. The housing 50 is a molded member of synthetic resin. The plurality of light sources 51 and the polygon mirror 52 are disposed in the housing 50.

Each of the plurality of light sources 51 is a laser light source that emits laser light. The laser light is an example of beam light. Each of the light sources 51 is an example of a beam light source that emits the beam light.

The polygon mirror 52 scans a plurality of pieces of laser light emitted from the plurality of light sources 51 by rotating while reflecting the plurality of pieces of laser light. The polygon mirror 52 scans the plurality of pieces of laser light along a first direction D1.

In the examples illustrated in FIGS. 3 and 4, a scanning direction SD1 of the plurality of pieces of laser light is a direction from a first side to a second side in the first direction D1.

The polygon mirror 52 includes a plurality of mirror surfaces 52a and a rotation shaft 52b. The plurality of mirror surfaces 52a is arranged in a regular-polygon shape in the circumferential direction. In the example illustrated in FIG. 3, the polygon mirror 52 has the six mirror surfaces 52a arranged in a regular-hexagon shape.

The polygon motor 521 rotates the rotation shaft 52b of the polygon mirror 52. This rotates the polygon mirror 52 on the rotation shaft 52b.

The laser scanning unit 5 further includes a cover 523 that covers the polygon mirror 52 (see FIGS. 3 and 4). A first opening 523a is formed in the cover 523. The plurality of pieces of laser light passes through the first opening 523a.

The plurality of pieces of laser light emitted from the plurality of light sources 51 is incident on the polygon mirror 52 through the first opening 523a. The plurality of pieces of laser light reflected by the polygon mirror 52 travels to the main lens 53 through the first opening 523a.

The cover 523 restrains the polygon mirror 52 from causing high-temperature air heated by heat generated by the polygon motor 521 to unevenly flow to a partial region in the housing 50. This restrains the temperature distribution in the housing 50 from being uneven and restrains the distribution of the thermal expansion of the housing 50 and an optical device in the housing 50 from being uneven. As a result, the precision of scanning the plurality of pieces of laser light is restrained from deteriorating due to the distribution of thermal expansion.

The main lens 53, the plurality of long mirrors 54, and the plurality of sub-lenses 55 are each attached into the housing 50 by using the first direction D1 as the longitudinal direction. That is, the main lens 53, the plurality of long mirrors 54, and the plurality of sub-lenses 55 are each disposed in the housing 50 along the first direction D1.

The plurality of long mirrors 54 reflects the plurality of respective pieces of laser light. The plurality of pieces of laser light is reflected by the plurality of long mirrors 54, and passes through the main lens 53 and the plurality of sub-lenses 55.

The main lens 53 is an fθ lens common to the four development colors. In this embodiment, the laser scanning unit 5 includes the four sub-lenses 55 corresponding to the four respective development colors.

The plurality of long mirrors 54 includes a first mirror 54a corresponding to black, a second mirror 54b and a third mirror 54c corresponding to cyan, a fourth mirror 54d corresponding to magenta, and a fifth mirror 54e corresponding to yellow (see FIGS. 3 and 4).

The main lens 53 is an fθ lens that transmits all the plurality of pieces of laser light with which the four photoconductors 41 are irradiated. The four sub-lenses 55 transmit some of the plurality of pieces of laser light with which the respective corresponding photoconductors 41 are irradiated.

The four sub-lenses 55 include a first sub-lens 55a corresponding to black, a second sub-lens 55b corresponding to cyan, a third sub-lens 55c corresponding to magenta, and a fourth sub-lens 55d corresponding to yellow (see FIGS. 3 and 4).

Incidentally, variations in the dimensions or the disposition of the plurality of mirror surfaces 52a in the polygon mirror 52 cause respective line images along the scanning direction SD1 to have varying positions and lengths. The variations in the dimensions or the like of the polygon mirror 52 may therefore cause a jitter image to be outputted.

Meanwhile, the timing of starting to form the electrostatic latent image on the photoconductor 41 by each of the light sources 51 and the pixel pitch of the electrostatic latent image in the scanning direction SD1 are appropriately controlled for each of the plurality of mirror surfaces 52a in the polygon mirror 52, thereby restraining the occurrence of the jitter image.

The timing of starting to form the electrostatic latent image for each of the plurality of mirror surfaces 52a is controlled on the basis of the timing at which the laser light scanned by each of the plurality of mirror surfaces 52a is sensed at a reference position in the scanning direction SD1.

The pixel pitches of the electrostatic latent images in the scanning direction SD1 are adjusted individually for the plurality of respective mirror surfaces 52a by preliminary adjustments. It is therefore necessary to grasp which of the plurality of mirror surfaces 52a is scanning the laser light.

For example, it is conceivable that a reflective light sensor senses a specific portion of the rotation shaft 52b of the polygon mirror 52 in the circumferential direction. The number of times the laser light is sensed at the reference position by using the time point at which the specific portion of the rotation shaft 52b is sensed by the light sensor as the starting point indicates one of the plurality of mirror surfaces 52a that is scanning the laser light.

However, if the light sensor is disposed near the rotation shaft 52b of the polygon mirror 52, a sense signal of the light sensor may be influenced by high-frequency sound that is generated by a collision between wind caused by the rotation of the polygon mirror 52 and a nearby object.

The laser scanning unit 5 includes components for preventing the occurrence of the jitter image due to the variations in the dimensions or the disposition of the plurality of mirror surfaces 52a in the polygon mirror 52 while avoiding the adverse influence of the wind generated by the rotation of the polygon mirror 52. The components will be described below.

The laser scanning unit 5 further includes a photoelectric conversion element 56, a light sensor substrate 570, and a sensing target portion 52c (see FIGS. 3 and 4). A light sensor 57, an amplification circuit 571, and a determination circuit 572 are mounted on the light sensor substrate 570 (see FIG. 3).

The photoelectric conversion element 56 is disposed apart from the motor board 520 (see FIG. 3). The photoelectric conversion element 56 senses the laser light reflected by each of the plurality of mirror surfaces 52a of the polygon mirror 52 at the reference position. The reference position is an upstream position of the main lens 53 in the scanning direction SD1.

The light sensor substrate 570 is disposed apart from the motor board 520 (see FIG. 3). The light sensor 57 is a reflective sensor including a light emitting portion 57a and a photoelectric conversion element 57b.

The light emitting portion 57a emits light to the rotation shaft 52b of the polygon mirror 52. The photoelectric conversion element 57b senses reflection light reflected by the rotation shaft 52b of the polygon mirror 52. The photoelectric conversion element 56 is an example of a first photoelectric conversion element and the photoelectric conversion element 57b is an example of a second photoelectric conversion element.

The sensing target portion 52c is provided to the rotation shaft 52b of the polygon mirror 52. The sensing target portion 52c has different light reflection characteristics from the light reflection characteristics of another portion of the rotation shaft 52b in the circumferential direction.

For example, the sensing target portion 52c is a mirror surface that is higher in light reflectivity than the other portion of the rotation shaft 52b in the circumferential direction. In this case, it is conceivable that a portion of the rotation shaft 52b other than the sensing target portion 52c is a black surface.

In addition, the sensing target portion 52c may be a black surface that is lower in light reflectivity than the other portion of the rotation shaft 52b in the circumferential direction. In this case, it is conceivable that a portion of the rotation shaft 52b other than the sensing target portion 52c is a mirror surface.

In this embodiment, the cover 523 of the polygon mirror 52 has a second opening 523b in addition to the first opening 523a (see FIGS. 3 and 4). The reflection light reflected by the rotation shaft 52b and traveling to the photoelectric conversion element 57b passes through the second opening 523b.

The amplification circuit 571 amplifies a sense signal of the photoelectric conversion element 57b. The determination circuit 572 determines whether the level of a sense signal of the photoelectric conversion element 57b amplified by the amplification circuit 571 is higher or lower than a reference level, and outputs a determination signal indicating a result of the determination.

When the sensing target portion 52c passes by the position opposed to the photoelectric conversion element 57b, the determination signal is active. When the sensing target portion 52c is not opposed to the photoelectric conversion element 57b, the determination signal is negative.

The laser control circuit 86 controls the timing of starting to form the electrostatic latent image on the photoconductor 41 by each of the light sources 51 for each of the plurality of mirror surfaces 52a on the basis of a sense signal of the photoelectric conversion element 56.

Specifically, the laser control circuit 86 senses, as a line starting point, the time point at which a predefined time passes from the time point at which the level of a sense signal of the photoelectric conversion element 56 exceeds a setting level. The line starting point is a starting point for forming the electrostatic latent image in the scanning direction SD1.

The laser control circuit 86 controls the timing of starting to form the electrostatic latent image for each line in the scanning direction SD1 on the basis of the line starting point.

Further, the laser control circuit 86 counts the number of times the line starting point is sensed by using the time point at which the determination signal is active as the starting point, and identifies a scanning surface in accordance with the count value. The scanning surface is one of the plurality of mirror surfaces 52a that is scanning the laser light.

That is, the laser control circuit 86 identifies the scanning surface on the basis of a sense signal of the photoelectric conversion element 57b amplified by the amplification circuit 571. Further, the laser control circuit 86 adjusts the pixel pitch of the electrostatic latent image for each scanning surface.

In this embodiment, pitch adjustment data DT1 set by a device adjustment is stored in the secondary storage device 83 (see FIG. 2). The pitch adjustment data DT1 indicates a plurality of pixel pitch candidates corresponding to the plurality of mirror surfaces 52a.

The pitch adjustment data DT1 is supplied to the laser control circuit 86 by the print control portion 8b. The laser control circuit 86 selects a target pixel pitch corresponding to the scanning surface from the plurality of pixel pitch candidates and controls the blinking time interval of each of the light sources 51 by using the target pixel pitch as the pixel pitch of the electrostatic latent image.

In the laser scanning unit 5, the light sensor 57 is disposed apart from the polygon motor 521. This prevents wind generated by the rotation of the polygon mirror 52 from adversely influencing a sense signal of the light sensor 57.

Further, the cover 523 that covers the polygon mirror 52 prevents the wind generated by the rotation of the polygon mirror 52 from directly hitting a nearby device.

However, the light sensor 57 is disposed apart from the polygon motor 521, thereby decreasing a change in a sense signal corresponding to light sensed by the light sensor 57. This disturbs the sensing of the sensing target portion 52c based on the sense signal of the light sensor 57.

Meanwhile, in the laser scanning unit 5, the amplification circuit 571 amplifies a sense signal of the light sensor 57. This allows the determination circuit 572 to reliably sense the sensing target portion 52c on the basis of the amplified sense signal.

Adopting the laser scanning unit 5 thus makes it possible to prevent the occurrence of a jitter image due to the variations in the dimensions or the disposition of the plurality of mirror surfaces 52a in the polygon mirror 52.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit comprising:
a beam light source that emits beam light;
a polygon mirror including a plurality of mirror surfaces and a rotation shaft, the polygon mirror scanning the beam light by rotating while reflecting the beam light;
a motor board on which a motor is mounted, the motor rotating the rotation shaft of the polygon mirror;
a first photoelectric conversion element that is disposed apart from the motor board, the first photoelectric conversion element sensing the beam light reflected by each of the plurality of mirror surfaces of the polygon mirror;
a sensing target portion that is provided to the rotation shaft of the polygon mirror, the sensing target portion having a different light reflection characteristic from a light reflection characteristic of another portion of the rotation shaft in a circumferential direction;
a light sensor that is disposed apart from the motor board, the light sensor including a light emitting portion and a second photoelectric conversion element, the light emitting portion emitting light to the rotation shaft of the polygon mirror, the second photoelectric conversion element sensing light reflected by the rotation shaft of the polygon mirror;
an amplification circuit that amplifies a sense signal of the second photoelectric conversion element; and
a control device that controls a timing of starting to form an electrostatic latent image on a photoconductor by the beam light source for each of the plurality of mirror surfaces on a basis of a sense signal of the first photoelectric conversion element, wherein
the control device identifies a scanning surface of the plurality of mirror surfaces that is scanning the beam light on a basis of the sense signal of the second photoelectric conversion element amplified by the amplification circuit, and adjusts a pixel pitch of the electrostatic latent image for each scanning surface.

2. The laser scanning unit according to claim 1, comprising a cover that covers the polygon mirror, wherein
the cover has a first opening through which the beam light passes and a second opening through which light reflected by the rotation shaft and traveling to the second photoelectric conversion element passes.

3. An image forming apparatus comprising:
a photoconductor;
the laser scanning unit according to claim 1, the laser scanning unit forming an electrostatic latent image on a surface of the photoconductor by scanning beam light over the surface of the photoconductor;
a developing device that develops the electrostatic latent image on the surface of the photoconductor by a developer; and
a transfer device that transfers an image on the surface of the photoconductor by the developer to a sheet.

* * * * *